United States Patent
Tsai et al.

(10) Patent No.: US 8,641,907 B2
(45) Date of Patent: *Feb. 4, 2014

(54) METHOD OF RECOVERING POLYHYDROXYALKANOATES (PHAS) FROM MUNICIPAL WASTE SLUDGE

(75) Inventors: Yung-Pin Tsai, Puli Township (TW); Meng-Shan Lu, Fongshan (TW); Chih-Chi Yang, Miaoli (TW); Shou-Te Chen, Sihu Township (TW)

(73) Assignee: National Chi Nan University, Puli, Nantou (TW)

( * ) Notice: Subject to any disclaimer, the term of this patent is extended or adjusted under 35 U.S.C. 154(b) by 608 days.

This patent is subject to a terminal disclaimer.

(21) Appl. No.: 12/950,541

(22) Filed: Nov. 19, 2010

(65) Prior Publication Data

US 2012/0006758 A1 Jan. 12, 2012

(30) Foreign Application Priority Data

Jul. 9, 2010 (TW) .............................. 99122691 A

(51) Int. Cl.
- *B01D 21/00* (2006.01)
- *C02F 1/52* (2006.01)
- *C02F 1/76* (2006.01)
- *B01D 37/00* (2006.01)
- *C02F 1/00* (2006.01)
- *C02F 1/34* (2006.01)

(52) U.S. Cl.
USPC ........... 210/710; 210/756; 210/713; 210/767; 210/748.02; 210/748.03; 210/748.05; 210/748.16; 210/739; 210/774; 210/787

(58) Field of Classification Search
USPC .................... 210/756, 713, 710, 767, 748.02, 210/748.03, 748.05, 748.16, 739, 774, 787
See application file for complete search history.

(56) References Cited

U.S. PATENT DOCUMENTS

| 4,025,448 | A | * | 5/1977 | Sudol | 252/60 |
| 5,536,419 | A | * | 7/1996 | Escalona et al. | 210/767 |
| 6,043,063 | A | * | 3/2000 | Kurdikar et al. | 435/135 |

FOREIGN PATENT DOCUMENTS

CN 101555314 A * 10/2009 ............. C08G 63/06

OTHER PUBLICATIONS

Derwent abstract of Chen et al (CN 101555314 A), Oct. 14, 2009.*

* cited by examiner

*Primary Examiner* — Nam Nguyen
*Assistant Examiner* — Nader Hossaini
(74) *Attorney, Agent, or Firm* — Panitch Schwarze Belisario & Nadel LLP

(57) ABSTRACT

A method of recovering polyhydroxyalkanoates (PHAs) from municipal waste sludge includes: (a) removing coarse particles in the municipal waste sludge and measuring a solid content in the municipal waste sludge in terms of a volatile suspended solid in the municipal waste sludge; (b) removing a supernatant from the municipal waste sludge; (c) freezing the municipal waste sludge; (d) adding a controlled amount of sodium hypochlorite solution to the municipal waste sludge that has been frozen, a ratio of the solid content of the municipal waste sludge to a volume of the sodium hypochlorite solution added in step (d) ranging from 0.67 mg/ml to 4 mg/ml and being defined as a liquid-solid ratio; and (e) separating PHAs from non-PHAs substances in the municipal waste sludge obtained in the step (d).

11 Claims, 6 Drawing Sheets

METHOD OF RECOVERING POLYHYDROXYALKANOATES (PHAS) FROM MUNICIPAL WASTE SLUDGE

CROSS-REFERENCE TO RELATED APPLICATION

This application claims priority of Taiwanese application no. 099122691, filed on Jul. 9, 2010.

BACKGROUND OF THE INVENTION

1. Field of the Invention

This invention relates to a method of recovering polyhydroxyalkanoates (PHAs), and more particularly to a method of recovering PHAs from municipal waste sludge.

2. Description of the Related Art

Polyhydroxyalkanoates (PHAs) are capable of being synthesized by microbial species present in municipal waste sludge or in an environment containing a carbon source and limited nutrients, such as nitrogen, phosphorous, sulfur, oxygen, magnesium, etc. PHAs are aliphatic polyesters accumulated in cells of PHAs producing microbial species. Polyhydroxybutyrate (PHB) and polyhydroxyvalerate (PHV) are commonly known PHAs that are synthesized by microbial species. PHAs are biodegradable, extendable and thermoplastic materials that are similar to polyethylene (PE) and polystyrene (PS) in terms of physical properties.

With environmental problems becoming more serious, the recovery of PHAs has attracted more interest. In conventional methods, microbial species are cultured to produce PHAs, which are then recovered by extraction. Examples of the conventional methods are disclosed in U.S. Pat. No. 7,141,400, Taiwan patent no. 283250, WO publication no. 2006/035889 and US patent application publication no. 2008/0193987.

PHAs are recovered using sodium hypochlorite, chloroform, or a surfactant in the prior art disclosed in (1) E. Berger et al., "PHB recovery by hypochlorite digestion of non-PHB biomass," Biotechnology Techniques (1989), vol. 3, no. 4, pages 227-232; (2) Sei Kwang Hahn et al., "Optimization of microbial poly(3-hydroxybutyate) recovery using dispersions of sodium-hypochlorite solution and chloroform," Biotechnology and Bioengineering (1994), vol. 44, pages 256-261; (3) J. A. Ramsay et al., "Recovery of poly-3-hydroxyalkanoic acid granules by surfactant-hypochlorite treatment," Biotechnology Techniques (1990), vol. 4, no. 4, pages 221-226; (4) Shih-Chen Tang, "Producing different polyhydroxyalkanates by microorganisms," Masters Thesis, 2007, Yuan Ze University, Department of biotechnology and bioinformatics; and (5) Xuping X U, et al., "Study on polyhydroxybutyrate (PHB) extraction from sphaerotilus natans by sodium hypochlorite-chloroform," Journal of FUJIAN normal university (natural science edition) (2004) vol. 20, no. 1, pages 74-77.

However, in order to obtain PHAs in relatively high purity and yield using the conventional methods, suitable microbial cells should be selected, and proper nutrients are needed to culture the microbial species with a sufficient period of time. Accordingly, the cost for recovery of PHAs using the conventional methods is high.

SUMMARY OF THE INVENTION

Therefore, an object of the present invention is to provide a method of recovering polyhydroxyalkanoates (PHAs) directly from municipal waste sludge that can overcome the aforesaid drawbacks associated with the prior art.

According to one aspect of this invention, a method of recovering polyhydroxyalkanoates (PHAs) from municipal waste sludge comprises:

(a) removing coarse particles in the municipal waste sludge and measuring a solid content in the municipal waste sludge in terms of a volatile suspended solid in the municipal waste sludge;

(b) removing a supernatant from the municipal waste sludge;

(c) freezing the municipal waste sludge to deactivate polyhydroxyalkanoates (PHAs) producing microbial species present in the municipal waste sludge;

(d) adding a controlled amount of sodium hypochlorite solution to the municipal waste sludge that has been frozen to digest the PHAs producing microbial species, a ratio of the solid content of the municipal waste sludge to a volume of the sodium hypochlorite solution added in step (d) ranging from 0.67 mg/ml to 4 mg/ml and being defined as a liquid-solid ratio; and (e) separating PHAs from non-PHAs substances in the municipal waste sludge obtained in the step (d).

According to another aspect of this invention, a method of recovering polyhydroxyalkanoates (PHAs) from municipal waste sludge comprises:

(a) removing coarse particles in the municipal waste sludge and measuring a solid content in the municipal waste sludge in terms of a concentration of volatile suspended solid (VSS) in the municipal waste sludge;

(b) removing a supernatant from the municipal waste sludge;

(c) freezing the municipal waste sludge to deactivate polyhydroxyalkanoates (PHAs) producing microbial species present in the municipal waste sludge;

(d) conducting a pretreatment of the municipal waste sludge that has been frozen, the pretreatment including: (I) ultrasonic treating the municipal waste sludge, (II) addition of sodium hypochlorite solution to the municipal waste sludge to digest the PHAs producing microbial species, and (III) heating the municipal waste sludge to a temperature ranging from 30° C. to 40° C., followed by removal of a supernatant from the municipal waste sludge;

(e) adding to the municipal waste sludge that has been pretreated a controlled amount of sodium hypochlorite solution having a concentration ranging from 10 v/v % to 100 v/v %, a ratio of a volume of sodium hypochlorite solution added in step (e) to the solid content of the municipal waste sludge ranging from 0.67 mg/ml to 3 mg/ml and being defined as a liquid-solid ratio; (f) contacting the municipal waste sludge obtained in the step (e) with chloroform at a temperature ranging from 30° C. to 40° C.; and (g) separating PHAs from non-PHAs substances in the municipal waste sludge obtained in the step (f).

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
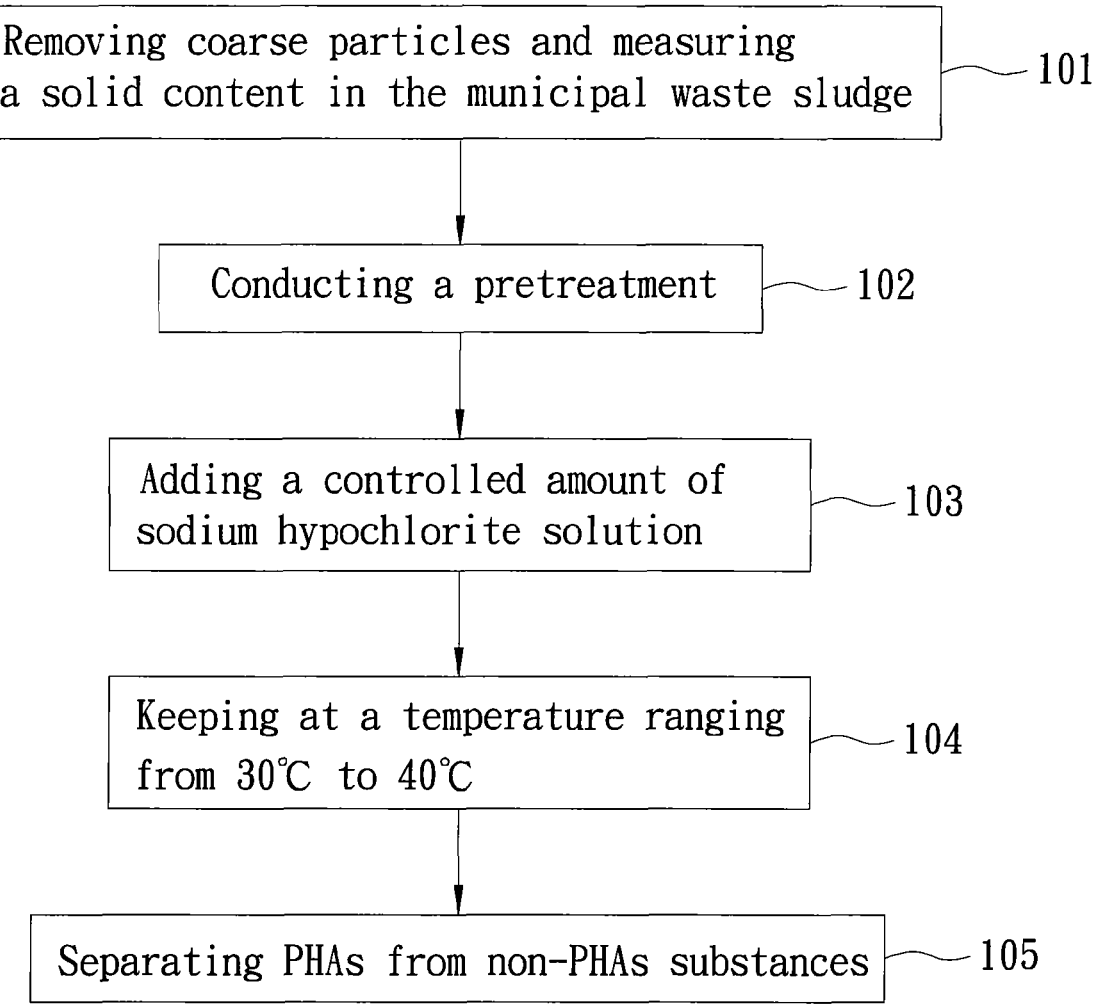
FIG. 1 is a flowchart illustrating a method of recovering polyhydroxyalkanoates (PHAs) from municipal waste sludge according to the first preferred embodiment of the present invention.

The first preferred embodiment of a method of recovering polyhydroxyalkanoates (PHAs) from municipal waste sludge according to the present invention comprises the steps illustrated in FIG. 1.

In step 101, coarse particles are removed from the municipal waste sludge, and a solid content in the municipal waste sludge is measured. The solid content is measured in terms of a concentration of volatile suspended solid (VSS) in the municipal waste sludge. After cleaning and removal of a supernatant from the municipal waste sludge, the waste sludge is frozen at a temperature below 0° C. to deactivate polyhydroxyalkanoates (PHAs) producing microbial species present in the municipal waste sludge so that PHAs accumulated in the microorganisms can be prevented from being metabolized. In order to ensure deactivation of all of the PHAs producing microbial species, the municipal waste sludge is frozen at −20° C. Preferably, the municipal waste sludge is centrifuged at 3000 rpm for 10 minutes to remove a supernatant therefrom, cleaned using distilled water, and re-centrifuged to remove a supernatant therefrom. The sludge that has been cleaned and dewatered is frozen and stored at −20° C.

The municipal waste sludge is obtained from a municipal wastewater treatment plant.

In step 102, a pretreatment of the municipal waste sludge that has been frozen is conducted. The pretreatment includes addition of sodium hypochlorite solution to the municipal waste sludge to digest the PHAs producing microbial species, followed by removal of a supernatant from the municipal waste sludge to obtain a pretreated sludge. The concentration of the sodium hypochlorite solution in this step is preferably 30 v/v %. For details of the concentration, reference is made to Sei Kwang Hahn et al., "Optimization of microbial poly (3-hydroxybutyate) recovery using dispersions of sodium-hypochlorite solution and chloroform," Biotechnology and Bioengineering (1994), vol. 44, pages 256-261.

Preferably, the pretreatment further includes one of the following sub-steps:

(102-1) Ultrasonic Treating the Municipal Waste Sludge

Ultrasonic treating is carried out using an ultrasonic treating device to rupture microbial cell walls. In an embodiment, an ultrasonic treating device having a power of 9 watts is used. For details of the ultrasonic treating, reference is made to Shih-Chen Tang, "Producing different polyhydroxyalkanoates by microorganisms," Masters Thesis, 2007, Yuan Ze University, Department of biotechnology and bioinformatics; and (102-2) Heating the Municipal Waste Sludge The municipal waste sludge is heated to a temperature above 30° C. for a period of time in an embodiment. For control of the heating temperature, reference is made to Xuping X U, et al., "Study on poly-hydroxybutyrate (PHB) extraction from sphaerotilus natans by sodium hypochlorite-chloroform," Journal of FUJIAN normal university (natural science edition) (2004) vol. 20, no. 1, pages 74-77.

In order to investigate the effect of the heating temperature, four samples of the municipal waste sludge that has been frozen are pretreated at room temperature, 37° C., 45° C. and 55° C., respectively. The samples that have been pretreated were subjected to the subsequent steps 103, 104, 105 of the method illustrated in FIG. 1. It is found that when the pretreatment is conducted at 37° C., the purity of PHAs produced by the method is the highest. Therefore, the heating temperature for the pretreatment is preferably 37° C.

In step 103, a controlled amount of sodium hypochlorite solution is added to the municipal waste sludge that has been pretreated in order to digest further the PHAs producing microbial species and to release PHAs. The amount of the sodium hypochlorite solution is determined based on the solid content (i.e., volatile suspended solid (VSS)) contained in the municipal waste sludge. A ratio of the solid content (VSS) of the municipal waste sludge to a volume of sodium hypochlorite solution added in this step should range from 0.67 mg/ml to 4 mg/ml. The term "liquid-solid ratio" used hereinafter refers to the ratio as specified above.

If the liquid-solid ratio is overly low (i.e., the sludge amount is much less than an amount that can be treated by the sodium hypochlorite solution added to the sludge), the sodium hypochlorite solution cannot be fully utilized, and PHAs contained in the municipal waste sludge may be damaged by an excess amount of the sodium hypochlorite solution. On the other hand, if the liquid-solid ratio is overlyhigh (i.e., the sludge amount is much greater than an amount that can be treated by the sodium hypochlorite solution added to the sludge), the sodium hypochlorite solution cannot effectively digest the PHAs producing microbial species. Accordingly, as long as the liquid-solid ratio is out of the range specified above, PHAs cannot be produced efficiently, and purity and yield of the PHAs may be relatively low.

Moreover, the concentration of the sodium hypochlorite solution preferably ranges from 10 v/v % to 100 v/v %. The release of PHAs may increase with an increase in the concentration of the sodium hypochlorite solution. However, if the concentration is too high, PHAs in the municipal waste sludge may be damaged by an excess amount of the sodium hypochlorite solution.

In step 104, the sludge that has been treated in step 103 is kept at a temperature ranging from 30° C. to 40° C. to facilitate a reaction between the sodium hypochlorite solution and the PHAs producing microbial species, wherein a temperature of 37° C. is preferred.

It is worth mentioning that the pretreatment in step 102 provides an initial rupturing of outer cell walls of microbial species, which enables the sodium hypochlorite solution added in step 103 to rapidly rupture microbial cells and to digest or decompose non-PHAs substances, thereby increasing the efficiency of extraction of PHAs.

In step 105, PHAs are separated from non-PHAs substances in the municipal waste sludge obtained in the step 104 to obtain a purified PHAs precipitate. In this embodiment, this step 105 is conducted by removal of a supernatant from the municipal waste sludge resulting in the step 104 through centrifugation, followed by addition of acetone and a subsequent centrifugation to remove a supernatant from the waste sludge. In order to obtain the PHA precipitate having higher purity of PHAs, the PHAs precipitate may be further cleaned using deionized water, followed by centrifugation to remove a supernatant from the PHAs precipitate. After drying the PHAs precipitate in an oven at 105° C., white powder of PHAs can be obtained.

Figure 2:
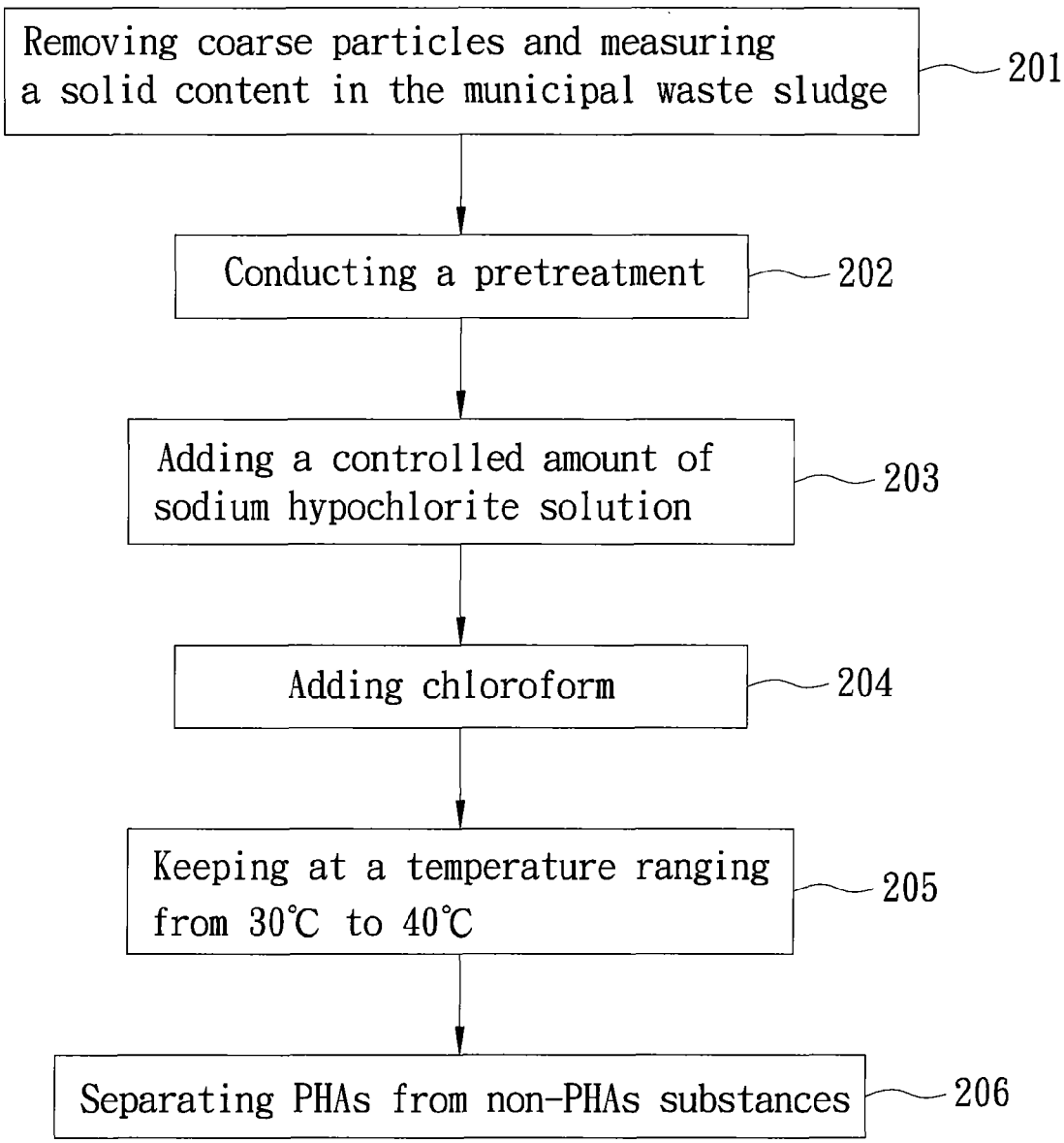
FIG. 2 is a flowchart illustrating a method of recovering polyhydroxyalkanoates (PHAs) from municipal waste sludge according to the second preferred embodiment of the present invention.

The second preferred embodiment of a method of recovering PHAs from municipal waste sludge according to the present invention comprises the steps illustrated in FIG. 2.

Steps 201, 202 and 203 are the same as the steps 101, 102 and 203.

In step 204, chloroform is added into the municipal waste sludge obtained in the step 203 for protecting the PHAs released by the microbial species from being damaged by the sodium hypochlorite solution and for increasing the purity and yield of the PHAs produced by the method of the second preferred embodiment of this invention.

In step 205, the municipal waste sludge obtained in the step 204 is kept at a temperature ranging from 30° C. to 40° C. to facilitate the interaction between the sodium hypochlorite solution and the PHAs producing microbial species, wherein a temperature of 37° C. is preferred.

In step 206, PHAs are separated from non-PHAs substances in the municipal waste sludge obtained in the step 205 to obtain a purified PHAs precipitate. In this embodiment, this step 206 is conducted by removal of a supernatant of the municipal waste sludge through centrifugation, followed by addition of cold ethanol (95%) and a subsequent centrifugation to remove a supernatant from the waste sludge and to obtain the PHAs precipitate. The PHAs precipitate may be further cleaned using deionized water, and dried in the oven to obtain a white powder of PHAs.

In the following experiments, it is demonstrated that the method of this invention can directly recover PHAs from the municipal waste sludge in a relatively high purity and that the pretreatment, the liquid-solid ratio and the concentration of the sodium hypochlorite solution are important for purity and yield (i.e., PHAs content) of the product made by the method according to the present invention. The PHAs purity can be calculated using the following equation:

$$\text{PHAs purity} = (C1+C2)/W1$$

where W1 is the weight of the dried PHAs powder, C1 and C2 are respectively the weights of PHB and PHV that are contained in the dried PHAs powder and that are measured by dissolving a predetermined amount of the dried PHAs powder into chloroform, followed by a quantitative analysis through a gas chromatography-mass spectrometry (GC-MS) technique.

$$\text{PHAs content} = (C1+C2)/W2$$

where W2 is the solid content (VSS) of the municipal waste sludge measured in the step 101 or 201, and is measured using a mixed liquor suspended solids (MLSS) analysis (NIEA W210.57A).

GC-MS is performed with a GC-17A capillary column (length: 30 m; diameter: 0.25 mm) and a flame ionization detector (FID). The flow rate of the carrier gas (nitrogen) is 2 ml/min. For each test, 2 μl of the test sample is injected into the injection port (split ratio: 1/20). The injection port and the FID respectively have the temperature of 230° C. and 275° C. The temperature in the chamber receiving the capillary column is controlled to be 80° C. for 4 minutes, and is then raised to 160° C. at a rate of 8° C./10 minutes.

Besides, the volume (i.e., the controlled amount) of sodium hypochlorite solution used in the step 103 or 203 is calculated by dividing the solid content of the municipal waste sludge (W2) by the predetermined liquid-solid ratio (the ratio of the solid content of the municipal waste sludge to the volume of the sodium hypochlorite solution predetermined for use in step 103 or 203).

Experiment 1

Effect of a Pretreatment on Recovery of PHAs (the First Preferred Embodiment)

A predetermined amount of municipal waste sludge was collected from a municipal wastewater treatment plant, and coarse particles in the municipal waste sludge were removed using a 1 mm filter screen, followed by conducting MLSS analysis on 20 mg-30 mg of the sludge that has been screened to measure the solid content in the screened sludge. The screened sludge was centrifuged at 3000 rpm to remove a supernatant therefrom, and frozen at −20° C. to obtain a frozen sludge. Although the step of freezing the screened sludge may be omitted, in order to prevent PHAs in the polyhydroxyalkanoates (PHAs) producing microbial species from being metabolized, it is preferable to conduct a freezing step for 1 hour. In the first experiment, four test samples of the frozen sludge were prepared, and were respectively subjected to the following four different pretreatments: (i) adding 5 ml of a sodium hypochlorite solution (30 v/v %), and allowing the mixture of the sodium hypochlorite solution and the municipal waste sludge to stand for 3 hours; (ii) adding 5 ml of the sodium hypochlorite solution (30 v/v %), and allowing the mixture of the sodium hypochlorite solution and the municipal waste sludge to stand for 3 hours at 37° C.; (iii) ultrasonic treating at a power of 9 watts for 1 minute, adding 5 ml of the sodium hypochlorite solution (30 v/v %), and allowing the mixture of the sodium hypochlorite solution and the municipal waste sludge to stand for 3 hours; and (iv) ultrasonic treating at a power of 9 watts for 1 minute, adding 5 ml of the sodium hypochlorite solution (30 v/v %), and allowing the mixture of the sodium hypochlorite solution and the municipal waste sludge to stand for 3 hours at 37° C.

After the pretreatment, each of the four test samples was centrifuged to remove a supernatant therefrom, and was mixed with the sodium hypochlorite solution (30 v/v %) to obtain a treated sludge so that the treated sludge has a liquid-solid ratio of 1.0 mg/ml. The treated sludge of each test sample was left to stand at 37° C. for 15 minutes, centrifuged to remove a supernatant therefrom, and dried in an oven to obtain a PHAs precipitate. The total weight of PHAs including PHB and PHV for each test sample was measured using a GC-MS technique, and the PHAs purity in each test sample was estimated as listed in Table 1.

TABLE 1

| Pretreatment | PHAs purity (wt %) | PHAs content* (mgPHA/gVSS) |
|---|---|---|
| (i) | 20.4 ± 2.10 | 24.2 ± 0.30 |
| (ii) | 20.6 ± 0.90 | 23.9 ± 0.25 |

TABLE 1-continued

| Pretreatment | PHAs purity (wt %) | PHAs content* (mgPHA/gVSS) |
|---|---|---|
| (iii) | 27.2 ± 2.00 | 23.8 ± 0.27 |
| (iv) | 28.8 ± 0.50 | 23.7 ± 0.37 |

*PHAs content means the total weight (mg) of PHAs per gram of VSS (volatile suspended solids).

The results in Table 1 show that the pretreatment does indeed influence the extraction result of PHAs, and that the PHAs purity is relatively high when the pretreatment (iii) or (iv) is conducted. Among the four pretreatments, the precipitate that was subjected to the pretreatment (iv) has the highest PHAs purity, and thus, in the following experiments, the pretreatment (iv) was used.

In the following experiments, experiments 2 to 4 were conducted according to the first preferred embodiment of this invention, and experiments 5 to 7 were conducted according to the second preferred embodiment of this invention.

Experiment 2

Effect of a Concentration of Sodium Hypochlorite Solution in Step 103 on Recovery of PHAs (the First Preferred Embodiment)

Twelve test samples were prepared following the procedure used in experiment 1 except that the twelve test samples were all subjected to the pretreatment (iv), and that the concentration of the sodium hypochlorite solutions added in the step 103 are 2 v/v %, 5 v/v %, 10 v/v %, 15 v/v %, 20 v/v %, 25 v/v %, 30 v/v %, 35 v/v %, 40 v/v %, 60 v/v %, 80 v/v %, and 100 v/v %, respectively. The liquid-solid ratio is 1 mg/ml for all test samples. Furthermore, the treated sludge for each test sample was centrifuged at 3000 rpm for 20 minutes to remove a supernatant therefrom, was reacted with 10 ml of acetone for 20 minutes, followed by centrifugation at 3000 rpm for 20 minutes to remove a supernatant (i.e., non-polyhydroxyalkanoate materials) from the treated sludge and to obtain a purified PHAs precipitate.

Figure 3:
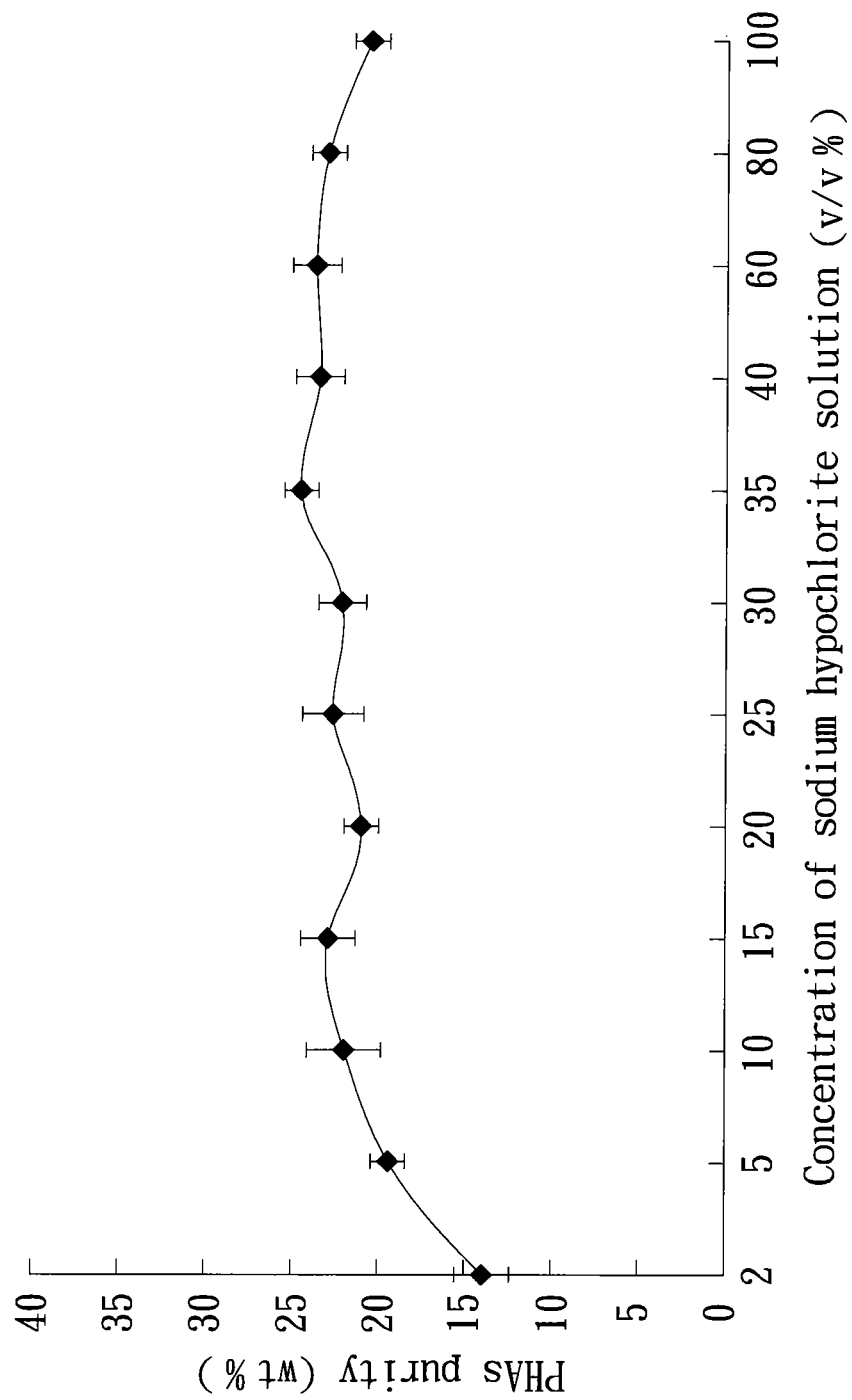
FIG. 3 is a plot illustrating the relation between concentrations of sodium hypochlorite solution and PHAs purity of a PHAs precipitate obtained by the method of the first preferred embodiment according to the present invention.

After measuring the weight of the PHAs precipitate and the total weight of PHAs using GC-MS, the PHAs purities of the twelve test samples were calculated to be 14.0±1.52 wt %, 19.4±0.90 wt %, 22.0±2.07 wt %, 22.8±1.59 wt %, 20.9±0.89 wt %, 22.6±1.80 wt %, 22.1±1.38 wt %, 24.5±0.99 wt %, 23.4±1.38 wt %, 23.6±1.29 wt %, 23.0±0.89 wt %, and 20.4±1.04 wt %, respectively, as shown in FIG. 3. When the concentration of the sodium hypochlorite solution increases from 2 v/v % to 10 v/v %, the PHAs purity is also increased. When the concentration of the sodium hypochlorite solution increases up to 15 v/v % or 25 v/v %, the slope of the PHAs purity becomes small. When the concentration of the sodium hypochlorite solution is higher than 60 v/v %, the PHAs purity starts to decrease appreciably. It is speculated that when the concentration of the sodium hypochlorite solution is too high, the PHAs accumulated in the microorganisms might be damaged in addition to the rupture of the cell walls of the microbial species. Accordingly, the concentration of the sodium hypochlorite solution ranges preferably from 10 v/v % to 60 v/v %. In order to reduce the cost, 15 v/v % to 25 v/v % is preferred. Therefore, in the following experiment 3, the concentration of the sodium hypochlorite solution added in the step 103 is set to 20 v/v %.

Experiment 3

Effect of a Liquid-Solid Ratio on Recovery of PHAs (the First Preferred Embodiment)

Seven test samples were prepared following the procedure employed in experiment 2 except that the concentration of the sodium hypochlorite solution added in the step 103 is set to 20 v/v %, and that the liquid-solid ratios for the seven test samples are 0.33 mg/ml, 0.40 mg/ml, 0.50 mg/ml, 0.67 mg/ml, 0.75 mg/ml, 0.85 mg/ml and 0.95 mg/ml, respectively.

Figure 4:
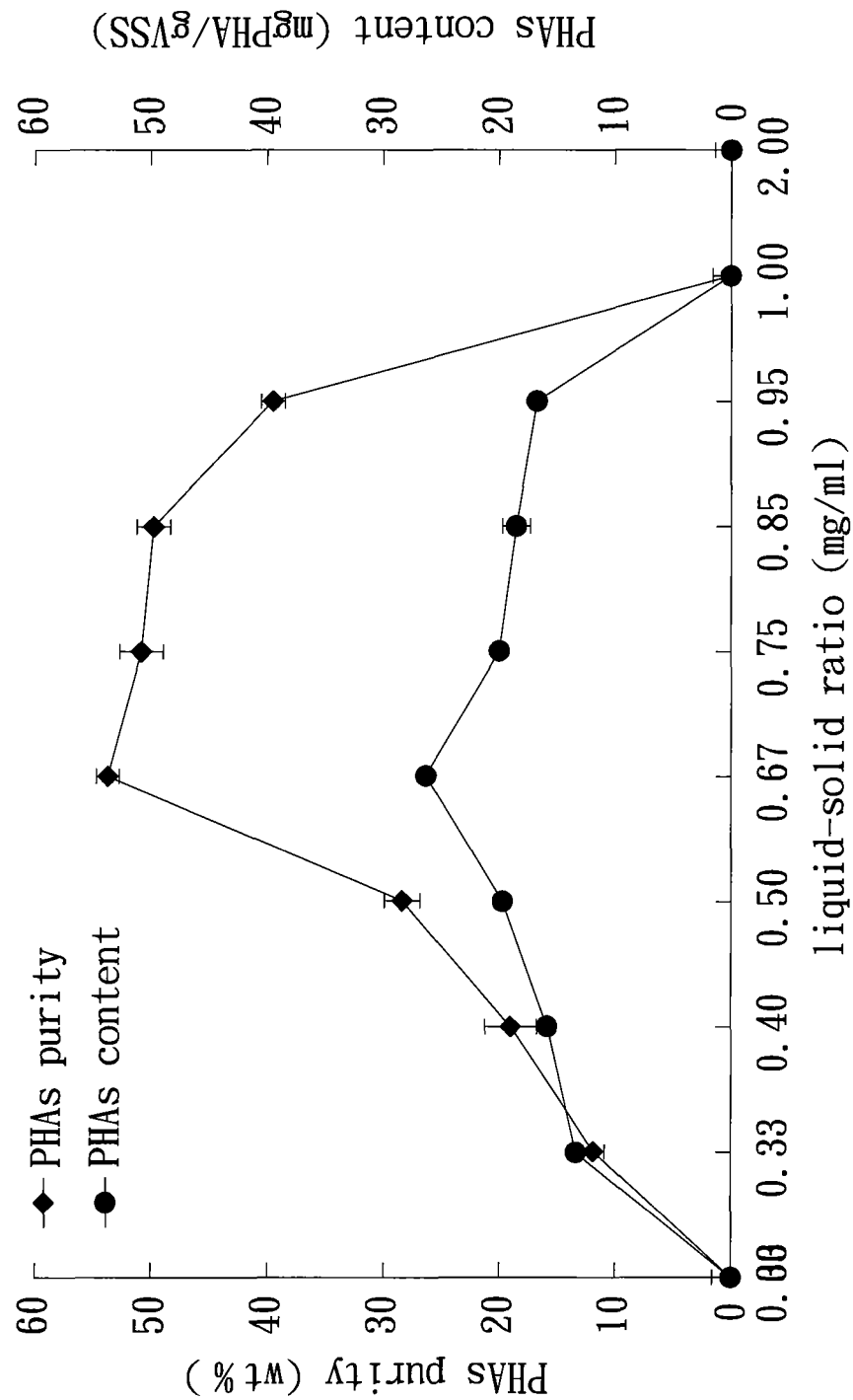
FIG. 4 is a plot illustrating the relation between a liquid-solid ratio of the municipal waste sludge after the controlled amount of sodium hypochlorite solution is added and PHAs purity and PHAs content of the PHAs precipitate obtained by the method of the first preferred embodiment according to the present invention.

The test results of the experiment 3 are shown in FIG. 4. The PHAs purities of the seven test samples are 11.7±0.05 wt %, 19.0±0.60 wt %, 28.2±0.72 wt %, 53.6±2.73 wt %, 50.7±2.83 wt %, 49.7±4.27, wt %, and 39.4±3.07 wt %, respectively. The PHAs contents of the seven test samples are 13.2±0.06 mgPHA/gVSS, 15.8±0.14 mgPHA/gVSS, 19.6±0.02 mgPHA/gVSS, 26.2±0.28 mgPHAs/gVSS, 19.9±0.48 mgPHA/gVSS, 18.4±1.09 mgPHA/gVSS, and 16.7±0.22 mgPHA/gVSS, respectively. When the liquid-solid ratio increases from 0.33 mg/ml to 0.67 mg/ml, both of PHAs purity and PHAs content increase accordingly. When the liquid-solid ratio is greater than 0.67 mg/ml, both of PHAs purity and PHAs content decrease. It is speculated that when the liquid-solid ratio is too high, the amount of the sludge is overly high, and the amount of the sodium hypochlorite solution might be insufficient to rupture the cell walls of the microbial species efficiently. Accordingly, the liquid-solid ratio preferably ranges from 0.67 mg/ml to 0.95 mg/ml, more preferably ranges from 0.67 mg/ml to 0.85 mg/ml, and 0.67 mg/ml is most preferred.

Experiment 4

Effect of a Standing Time for Allowing the Sludge to Stand Together with the Sodium Hypochlorite Solution in Step 103 (the First Preferred Embodiment)

Eleven test samples were prepared following the procedure of experiment 3 except that the liquid-solid ratio in each test sample is 0.67 mg/ml, and that the eleven test samples were left to stand at 37° C. together with the sodium hypochlorite solution added in step 103. The standing time for the eleven test samples are 15 minutes, 30 minutes, 45 minutes, 60 minutes, 90 minutes, 120 minutes, 240 minutes, 360 minutes, 480 minutes, 600 minutes and 720 minutes, respectively.

Figure 5:
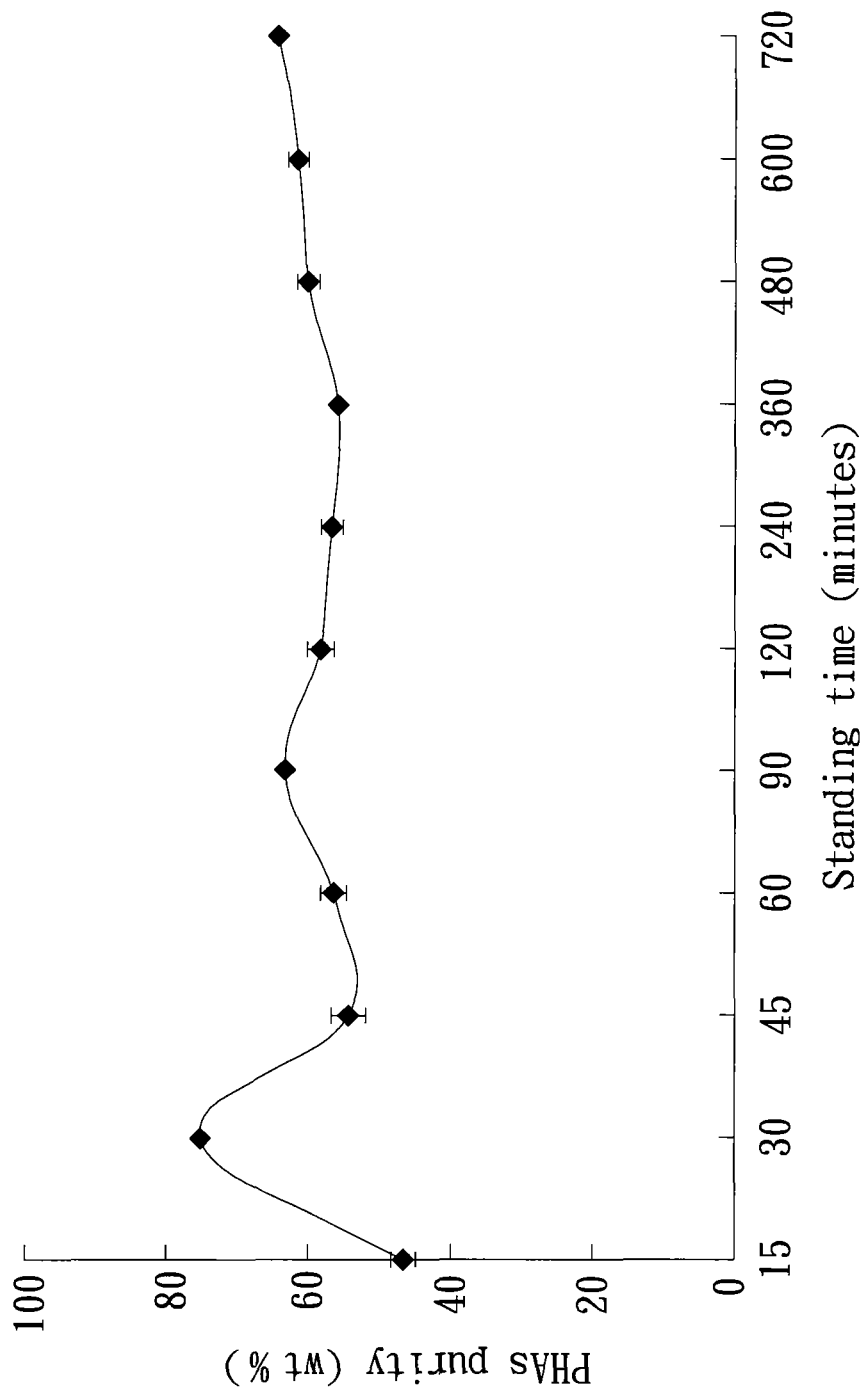
FIG. 5 is a plot illustrating the relation between a standing time after the controlled amount of sodium hypochlorite solution is added and PHAs purity and PHAs content of the PHAs precipitate obtained by the method of the first preferred embodiment according to the present invention.

The test results of the experiment 4 are shown in FIG. 5. The PHAs purities of the eleven test samples are 46.9±6.07 wt %, 75.3±1.85 wt %, 54.6±7.35 wt %, 56.8±9.75 wt %, 63.6±4.62 wt %, 58.6±8.90 wt %, 56.9±1.62 wt %, 56.2±4.47 wt %, 60.3±3.99 wt %, 61.7±2.32 wt % and 64.4±1.73 wt %, respectively. When the standing time increases from 15 minutes to 30 minutes, the PHAs purity increases to 75.3±1.85 wt %. When the standing time increases from 30 minutes to 45 minutes, the PHAs purity decreases significantly; when the standing time increases from 45 minutes to 720 minutes, the PHAs purity does not change appreciably. It is speculated that the decrease in the PHAs purity might result from the overly long standing time, which causes the sodium hypochlorite solution to damage the PHAs accumulated in the microbial species.

Based on the results of the experiments 2 to 4, in order to obtain a PHAs precipitate with a relatively high PHAs purity, it is preferable to use the sodium hypochlorite solution having a concentration of 20 v/v %, a liquid-solid ratio of 0.67 mg/ml, a heating temperature of 37° C., and a standing time of 30 minutes in the first preferred embodiment.

Experiment 5

Effect of a Concentration of a Sodium Hypochlorite Solution in Step 203 on Recovery of PHAs (the Second Preferred Embodiment)

Ten test samples were prepared following the procedure of experiment 1 except that the ten test samples were all subjected to the pretreatment of (iv), and that the concentrations of the sodium hypochlorite solutions added in step 203 are 5 v/v %, 10 v/v %, 15 v/v %, 20 v/v %, 25 v/v %, 30 v/v %, 40 v/v %, 60 v/v %, 80 v/v %, and 100 v/v %, respectively. The liquid-solid ratio for each test sample is 1.0 mg/ml. The treated sludge of each test sample was subsequently mixed with 10 ml of chloroform and was left to stand at 37° C. for 15 minutes. Thereafter, the treated sludge of each test sample was centrifuged at 3000 rpm for 20 minutes to remove a supernatant therefrom. 20 ml of cold ethanol (95% concentration) was added so as to make PHAs precipitate, followed by centrifugation at 3000 rpm for 20 minutes to remove a supernatant (i.e., non-polyhydroxyalkanoate materials) from the treated sludge and to obtain a purified PHAs precipitate.

The results are shown in Table 2.

that, because chloroform was further added to the treated sludge for protecting PHAs released from the microbial species, the method of the second embodiment may use the sodium hypochlorite solution with higher concentration to obtain the PHAs precipitate with higher purity compared to that produced by the first embodiment.

Experiment 6

Effect of a Liquid-Solid Ratio on Recovery of PHAs (the Second Preferred Embodiment)

Eight test samples were prepared following the procedure of experiment 5 except that the concentration of the sodium hypochlorite solution that is added in step 203 is 30 v/v %, and that the liquid-solid ratios for the eight test samples are 0.33 mg/ml, 0.40 mg/ml, 0.50 mg/ml, 0.67 mg/ml, 1 mg/ml, 2 mg/ml, 3 mg/ml and 4 mg/ml, respectively.

Figure 6:
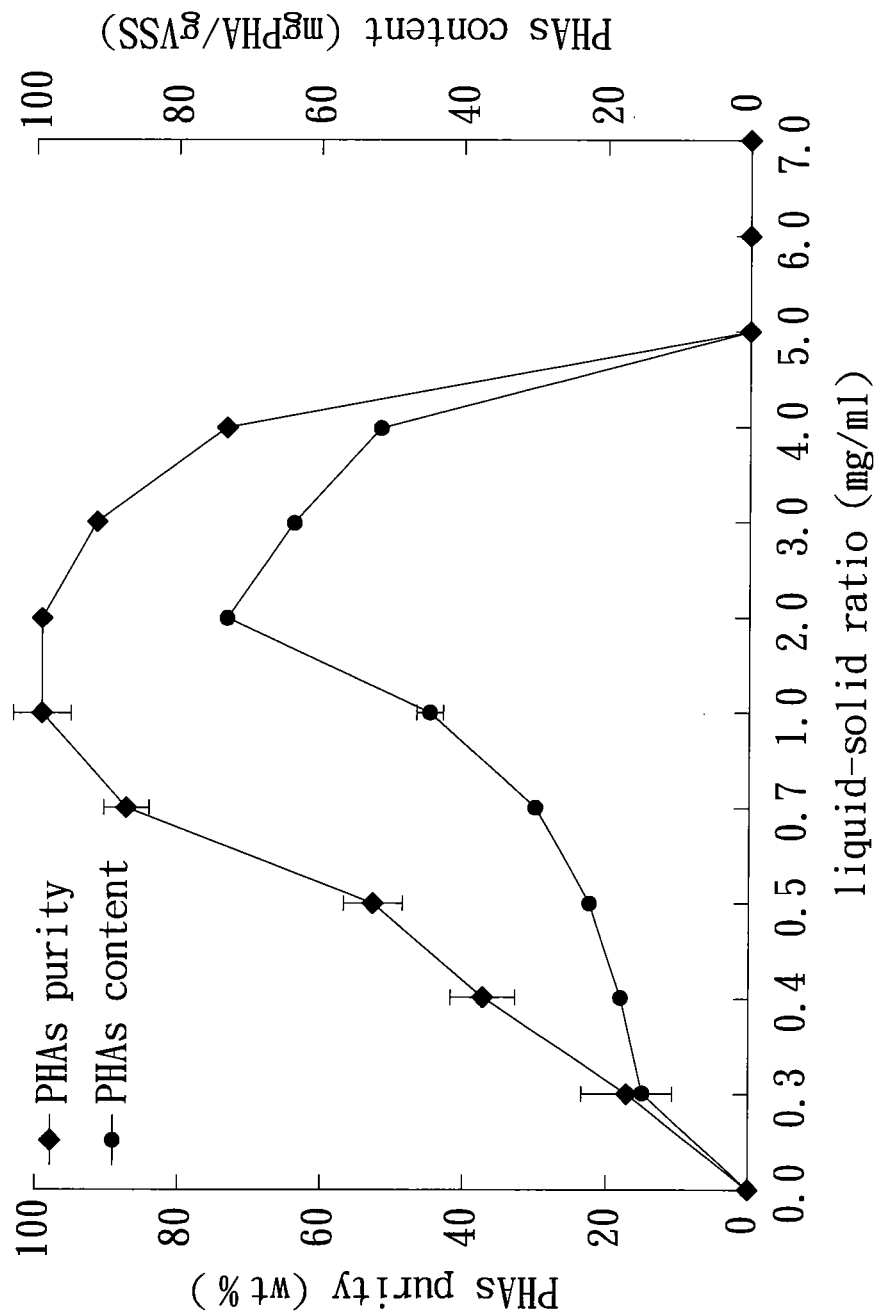
FIG. 6 is a plot illustrating the relation between a liquid-solid ratio of the municipal waste sludge after the controlled amount of sodium hypochlorite solution is added and PHAs purity and PHAs content of the PHAs precipitate obtained by the method of the second preferred embodiment according to the present invention.

The test results of the experiment 6 are shown in FIG. 6. The PHAs purities of the eight test samples are 16.9±1.46 wt %, 37.2±6.50 wt %, 52.5±4.42 wt %, 87.1±4.10 wt %, >99.0 wt %, >99.0 wt %, 91.4±4.42 wt % and 73.0±3.34 wt %, respectively. The PHAs contents of the eight test samples are 14.8±0.03 mgPHA/gVSS, 17.8±0.09 mgPHA/gVSS, 22.3±0.19 mgPHA/gVSS, 29.8±0.34 mgPHA/gVSS, 44.6±0.27 mgPHA/gVSS, 73.0±1.74 mgPHA/gVSS, 63.7±1.67 mgPHA/gVSS and 51.6±1.42 mgPHA/gVSS, respectively. When the liquid-solid ratio increases from 0.33 mg/ml to 2 mg/ml, PHAs purity and PHAs content increase accordingly. When the liquid-solid ratio is greater than 2 mg/ml, both of PHAs purity and PHAs content decrease. Accordingly, the liquid-solid ratio is preferably from 0.67 mg/ml to 4 mg/ml, more preferably ranges from 0.67 mg/ml

TABLE 2

| | NaOCl* (v/v %) | | | | | | | | | |
|---|---|---|---|---|---|---|---|---|---|---|
| | 5 | 10 | 15 | 20 | 25 | 30 | 40 | 60 | 80 | 100 |
| PHAs purity (wt %) | 92.6 ± 4.51 | 96.1 ± 3.62 | 98.8 ± 3.14 | 99.2 ± 2.52 | >99.0 | >99.0 | >99.0 | 96.6 ± 1.85 | 94.7 ± 2.48 | 93.9 ± 3.29 |

When the concentration of the sodium hypochlorite solution increases from 5 v/v % to 25 v/v %, the PHAs purity is also increased. When the concentration of the sodium hypochlorite solution increases from 25 v/v % to 40 v/v %, the PHAs purity is greater than 99.0 wt %. When the concentration of the sodium hypochlorite solution increases further to 60 v/v %, the PHAs purity starts to decrease. It is speculated that, when the concentration of the sodium hypochlorite solution is too high, the sodium hypochlorite solution might cause damage to the PHAs accumulated in the microbial species in addition to the rupture of the cell walls of the microbial species. Accordingly, the concentration of the sodium hypochlorite solution ranges preferably from 10 v/v % to 100 v/v %, and more preferably form 25 v/v % to 40 v/v %, and 30 v/v % is most preferred. Therefore, in the experiments 6 and 7, the concentration of the sodium hypochlorite solution added in step 203 was 30 v/v %. On the other hand, it is noted to 3 mg/ml, and most preferably ranges from 1 mg/ml to 2 mg/ml to obtain better results of PHAs extraction.

Experiment 7

Effect of a Standing Time for Allowing the Sludge to Stand Together with the Sodium Hypochlorite Solution in Step 203 (the Second Preferred Embodiment)

Thirteen test samples were prepared following the procedure used in experiment 6 except that the liquid-solid ratio in each test sample is 2 mg/ml, and that, after 10 ml of chloroform was added, the treated sludges of the thirteen test samples were left to stand at 37° C. for 5 minutes, 10 minutes, 15 minutes, 30 minutes, 45 minutes, 60 minutes, 90 minutes, 120 minutes, 240 minutes, 360 minutes, 480 minutes, 600 minutes and 720 minutes, respectively.

The test results of the experiment 7 are shown in Table 3.

TABLE 3

| | Standing time (min) | | | | | | | | | | | | |
|---|---|---|---|---|---|---|---|---|---|---|---|---|---|
| | 5 | 10 | 15 | 30 | 45 | 60 | 90 | 120 | 240 | 360 | 480 | 600 | 720 |
| PHAs purity (wt %) | 71.7 ± 2.57 | 75.4 ± 5.83 | 89.7 ± 1.69 | 95.3 ± 4.00 | >99.0 | 88.9 ± 7.98 | 73.4 ± 3.63 | 76.0 ± 1.19 | 73.5 ± 6.05 | 69.8 ± 3.00 | 64.0 ± 4.54 | 64.6 ± 4.97 | 63.7 ± 0.06 |

The results in Table 3 show that, when the standing time is less than 45 minutes, the PHAs purity increases with an increase in the standing time, and is greater than 99.0 wt % at the standing time of 45 minutes. When the standing time is longer than 45 minutes, the PHAs purity starts to decrease. It is speculated that PHAs accumulated in the microbial species might be damaged by the sodium hypochlorite solution that interacted with the microbial species for a long time. The results in Table 3 further show that, because chloroform was further added to the treated sludge in the second embodiment, the PHAs accumulated in the microbial species may endure longer standing time, and the PHAs purity is higher compared to the results of the first embodiment shown in FIG. 5.

Based on the results of the experiments 5 to 7, in order to obtain a PHAs precipitate with a relatively high PHAs purity, it is preferable to use a sodium hypochlorite solution of 30 v/v % to have a liquid-solid ratio of 2 mg/ml and to be left to stand at 37° C. for 45 minutes after chloroform is added.

In summary, the method of this invention has the following advantages:

(1) The method of this invention is capable of directly extracting PHAs from the waste sludge without culturing PHAs-producing microorganisms that is time-consuming and not cost-effective. Thus, by virtue of the method of this invention, the cost and time concerning the culture of PHAs-producing microorganisms can be saved.

(2) By limiting the liquid-solid ratio employed in steps 103 and 203 of the method according to the present invention to a specific range, the PHAs precipitate extracted from the municipal waste sludge can have a PHAs purity greater than 99.0 wt %. Thus, the method of this invention may be used to produce PHAs on an industrial scale.

(3) The main extracting agent used in this invention is a sodium hypochlorite solution that is environmental-friendly, and thus, the method of this invention is expected to have a relatively low environmental impact.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A method of recovering polyhydroxyalkanoates (PHAs) from municipal waste sludge, comprising:
   (a) removing coarse particles in the municipal waste sludge and measuring a mass of a solid content in the municipal waste sludge in terms of a volatile suspended solid in the municipal waste sludge;
   (b) removing a supernatant from the municipal waste sludge;
   (c) freezing the municipal waste sludge to deactivate polyhydroxyalkanoates (PHAs) producing microbial species present in the municipal waste sludge;
   (d) adding a controlled amount of sodium hypochlorite solution to the municipal waste sludge that has been frozen to digest the PHAs producing microbial species, wherein a ratio of the mass of the solid content of the municipal waste sludge to a volume of the sodium hypochlorite solution added ranges from 0.67 mg/ml to 4 mg/ml; and
   (e) separating PHAs from non-PHAs substances in the municipal waste sludge obtained in step (d).

2. The method of claim 1, wherein the ratio ranges from 0.67 mg/ml to 3 mg/ml.

3. The method of claim 2, wherein the sodium hypochlorite solution in step (d) has a concentration ranging from 10 v/v % to 100 v/v %.

4. The method of claim 2, wherein step (e) is conducted by removal of a supernatant from the municipal waste sludge obtained in step (d) through centrifugation, followed by addition of acetone and a subsequent centrifugation to remove a supernatant from the municipal waste sludge.

5. The method of claim 1, further comprising, before step (d), conducting a pretreatment of the municipal waste sludge that has been frozen, the pretreatment including addition of sodium hypochlorite solution to the municipal waste sludge, followed by removal of a supernatant from the municipal waste sludge.

6. The method of claim 5, wherein the pretreatment further includes at least one of the following sub-steps: (I) ultrasonic treatment of the municipal waste sludge; and (II) heating the municipal waste sludge to a temperature ranging from 30° C to 40° C.

7. The method of claim 1, wherein step (d) is conducted at a temperature of 37° C.

8. The method of claim 1, further comprising a step of adding chloroform into the municipal waste sludge obtained in step (d), before step (e).

9. The method of claim 8, wherein step (e) is conducted by removal of a supernatant of the municipal waste sludge through centrifugation after chloroform is added, followed by addition of ethanol and a subsequent centrifugation to remove a supernatant from the municipal waste sludge.

10. The method of claim 9, wherein the ethanol has a concentration of 95%.

11. A method of recovering polyhydroxyalkanoates (PHAs) from municipal waste sludge, comprising:
   (a) removing coarse particles in the municipal waste sludge and measuring a mass of a solid content in the municipal waste sludge in terms of a concentration of volatile suspended solid (VSS) in the municipal waste sludge;
   (b) removing a supernatant from the municipal waste sludge;
   (c) freezing the municipal waste sludge to deactivate polyhydroxyalkanoates (PHAs) producing microbial species present in the municipal waste sludge;
   (d) conducting a pretreatment of the municipal waste sludge that has been frozen, the pretreatment including:

(I) ultrasonic treatment of the municipal waste sludge, (II) addition of a sodium hypochlorite solution to the municipal waste sludge to digest the PHAs producing microbial species, and (III) heating the municipal waste sludge to a temperature ranging from 30° C. to 40° C., followed by removal of a supernatant from the municipal waste sludge;

(e) adding to the municipal waste sludge that has been pretreated a controlled amount of sodium hypochlorite solution having a concentration ranging from 10 v/v % to 100 v/v %, wherein a ratio of the mass of the solid content of the municipal waste sludge to a volume of the sodium hypochlorite solution added ranges from 0.67 mg/ml to 3 mg/ml;

(f) contacting the municipal waste sludge obtained in the step (e) with chloroform at a temperature ranging from 30° C. to 40° C.; and (g) separating PHAs from non-PHAs substances in the municipal waste sludge obtained in the step (f).

* * * * *